(12) United States Patent
Desrochers et al.

(10) Patent No.: US 10,035,597 B2
(45) Date of Patent: Jul. 31, 2018

(54) SONOTUBE DEPLOYABLE MULTICOPTER

(71) Applicants: Douglas Desrochers, Burke, VA (US); David Desrochers, Burke, VA (US)

(72) Inventors: Douglas Desrochers, Burke, VA (US); David Desrochers, Burke, VA (US)

( * ) Notice: Subject to any disclaimer, the term of this patent is extended or adjusted under 35 U.S.C. 154(b) by 149 days.

(21) Appl. No.: 15/238,200

(22) Filed: Aug. 16, 2016

(65) Prior Publication Data

US 2017/0166308 A1   Jun. 15, 2017

Related U.S. Application Data

(60) Provisional application No. 62/205,965, filed on Aug. 17, 2015.

(51) Int. Cl.
*B64C 25/00* (2006.01)
*B64D 1/08* (2006.01)
(Continued)

(52) U.S. Cl.
CPC .............. *B64D 1/08* (2013.01); *B64C 1/30* (2013.01); *B64C 39/024* (2013.01); *B64D 17/80* (2013.01);
(Continued)

(58) Field of Classification Search
CPC .... B64D 1/02; B64D 1/08; B64C 1/30; B64C 39/024; B64C 39/028; B64C 2201/08;
(Continued)

(56) References Cited

U.S. PATENT DOCUMENTS 6,056,237 A     5/2000  Woodland
8,052,081 B2 *  11/2011 Olm ................... B64C 39/024
                                                244/17.23
(Continued)

FOREIGN PATENT DOCUMENTS

CN    103332291 A    10/2013
CN    203753400 U     8/2014
CN    105000163 A    10/2015

OTHER PUBLICATIONS

RC-Drones, Custom Built Ready to Fly UAV's, Kits, Parts & More, "Phoenix Flight Gear Xtreme CarbonQuad Foldable FPV TIG Edition Micro RTF", Phoenix Flight Gear Xtreme CarbonQuad Foldable FPV Tiger Edition Micro RTF, http://www.rcdrones.com/PhoenixFlightGearXtremeCarbonQuadFoldableFPVTIGEREDIT-IONMicroRTF_p_640.html, retrieved Aug. 5, 2016.
(Continued)

*Primary Examiner* — Richard G Davis
(74) *Attorney, Agent, or Firm* — The Marbury Law Group, PLLC

(57) ABSTRACT

An unmanned aerial system (UAS) including a sonotube deployable multicopter (SDM) having a plurality of rotors for propulsion, a plurality of extension arms, and a central pivot device. Each extension arm supports at least one of the plurality of rotors. The central pivot device supports the plurality of extension arms radially extending from the central pivot device. Pivotal movement of a first arm-support structure of the central pivot device relative to a second arm-support structure of the central pivot device rotates a first pair of the plurality of extension arms in unison relative to a second pair of the plurality of extension arms. The pivotal movement is biased to rotate the plurality of extension arms from a compact configuration to an expanded configuration while the UAS is airborne. The SDM configured to be held inside a sonoshell in the compact configuration.

20 Claims, 9 Drawing Sheets

(51) Int. Cl.
*B64C 39/02* (2006.01)
*B64D 17/80* (2006.01)
*B64C 1/30* (2006.01)

(52) U.S. Cl.
CPC .. *B64C 2201/027* (2013.01); *B64C 2201/108* (2013.01); *B64C 2201/12* (2013.01); *B64C 2201/141* (2013.01); *B64C 2201/146* (2013.01); *B64C 2201/206* (2013.01)

(58) Field of Classification Search
CPC ........ B64C 2201/082; B64C 2201/108; B64C 2201/20; B64C 2201/201; B64C 2201/206; B64C 2201/024
See application file for complete search history.

(56) References Cited

U.S. PATENT DOCUMENTS

| | | | |
|---|---|---|---|
| 8,292,215 B2 | 10/2012 | Olm et al. | |
| 8,662,441 B2 | 3/2014 | Powell et al. | |
| 2011/0006166 A1* | 1/2011 | Arlton | B64C 27/10 244/7 A |
| 2012/0205488 A1* | 8/2012 | Powell | B64C 39/024 244/63 |
| 2016/0159471 A1* | 6/2016 | Chan | B64C 39/024 244/39 |
| 2017/0029101 A1* | 2/2017 | Weissenberg | B64C 27/006 |

OTHER PUBLICATIONS

Intergeo, MultiROTOR, Surveying Robot Instant Start Complete Package for surveying, "Multirotor G4 Surveying-Robot", https://www.servicedrone.com/en/products/surveyingrobot, retrieved Aug. 5, 2016.

Tarot, "Tarot T810 Hexacopter Foldable Frame", http://www.getfpv.com/tarott810hexacopterfoldableframe.html, retrieved Aug. 8, 2016.

DroneCam, http://www.dronecam.net/index.html, retrieved Aug. 16, 2016.

* cited by examiner

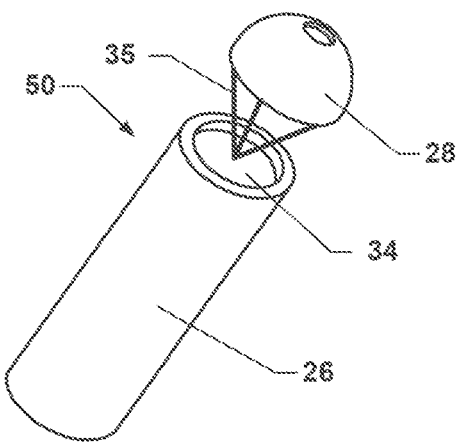
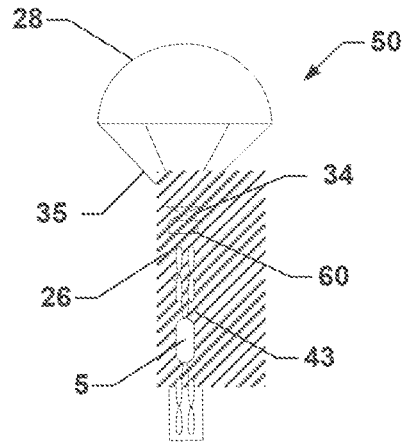
FIG. 5A
FIG. 5B
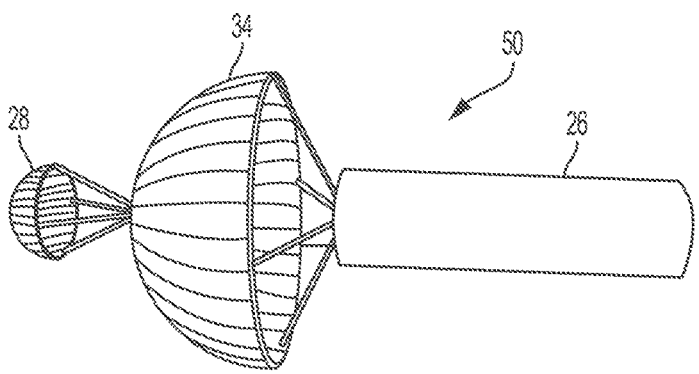
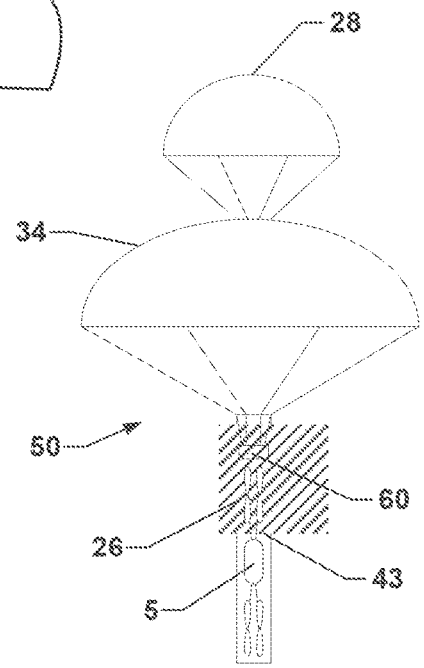
FIG. 6A
FIG. 6B

SONOTUBE DEPLOYABLE MULTICOPTER

RELATED APPLICATIONS

This application claims the benefit of priority to U.S. Provisional Patent Application 62/205,965 entitled "Sonotube Deployable Multicopters," filed Aug. 17, 2015, the entire contents of which are incorporated herein by reference.

BACKGROUND

Patrol/surveillance aircraft, such as the P-3, P-8, C-130, HC-144, or HU-25, often deploy static sensors or use unmanned aerial systems (UAS) that either hover or require forward flight for lift, but not both. Modern patrol aircraft benefit by maintaining high altitudes in order to perform networking and broader search capabilities. At such altitudes, remote sensors may be deployed with increased data resolution and increased patrol aircraft persistence.

SUMMARY

Devices, systems, and methods of various embodiments are disclosed including a compact, highly maneuverable, and hover-capable direct-thrust multicopter using a sonobuoy-style dispenser system. The multicopter (i.e., a sonotube deployable multicopter (SDM)) may be packaged in a protective shell (i.e., a sonoshell) as part of an unmanned aerial system (UAS) configured to fit within a small tube (e.g., a sonobouy tube) for separating and/or being deployed from an aircraft. Once separated from the aircraft, the UAS including the SDM in the sonoshell may descend to a preset altitude and deploy from the sonoshell. As part of deployment, the SDM may automatically reconfigure itself from a compact configuration to an expanded configuration, enabling hovering and navigational flight capable of performing other functions.

Various embodiments include an SDM having a plurality of rotors, a plurality of extension arms, and a central pivot device. The plurality of rotors are configured to generate propulsion for the SDM. Each extension arm supports at least one of the plurality of rotors. The central pivot device supports the plurality of extension arms radially extending from the central pivot device. Pivotal movement of a first arm-support structure of the central pivot device relative to a second arm-support structure of the central pivot device rotates a first pair of the plurality of extension arms in unison relative to a second pair of the plurality of extension aims. The pivotal movement is biased to rotate the plurality of extension arms from a compact configuration to an expanded configuration while the SDM is airborne.

In various embodiments, the first pair of the plurality of extension arms may be fixed to the first arm-support structure and the second pair of the plurality of extension arms are fixed to the second arm-support structure. Each of a first extension arm and a second extension arm of the plurality of extension arms may extend in opposed directions from the central pivot device. The first extension aim and the second extension arm may extend along a mutual longitudinal axis in both the compact configuration and the expanded configuration. The first extension arm and the second extension arm may be formed together as a continuous structure extending through the central pivot device. The first pair of the plurality of extension arms may extend in opposed directions away from the first arm-support structure along a first mutual longitudinal axis and the second pair of the plurality of extension arms may extend in opposed directions away from the second arm-support structure along a second mutual longitudinal axis.

Various embodiments include a UAS having a sonoshell configured to be deployed from an airborne vehicle. The sonoshell may be configured with a hollow inner chamber for holding therein an SDM in a compact configuration. The SDM may be biased to expand from the compact configuration to an expanded configuration once released from the sonoshell while airborne. The sonoshell may include a release mechanism contained therein. The release mechanism may include a chute latch and an SDM latch for controlling a release separately of each of a parachute and the SDM from the sonoshell.

In various embodiments, the sonoshell may restrict the SDM from pivoting to the expanded configuration while the SDM is disposed within the sonoshell. The UAS may include the SDM, which may include a plurality of rotors, a plurality of extension arms, and a central pivot device. The plurality of rotors may be configured to generate propulsion for the SDM. Each of the extension arm may support at least one of the plurality of rotors. The central pivot device may support the plurality of extension arms radially extending from the central pivot device. A first arm-support structure of the central pivot device may be biased to pivot relative to a second arm-support structure of the central pivot device. Pivotal movement of the first and second arm-support structures rotates a first pair of the plurality of extension arms in unison relative to a second pair of the plurality of extension arms from the compact configuration to the expanded configuration while the SDM is airborne.

In various embodiments, the UAS may also include a drogue chute configured to stabilize the sonoshell once deployed from the airborne vehicle. The UAS may also include the parachute, which may be configured to deploy from the sonoshell after a rapid fall period following the sonoshell being deployed from the airborne vehicle.

Various embodiments include a UAS including a sonoshell and an SDM. The sonoshell may be configured to be deployed from an airborne vehicle. The SDM may be configured to be held within and deployed from the sonoshell. The SDM may include a plurality of rotors to generate propulsion for the SDM, a plurality of extension arms to support the plurality of rotors, and a central pivot device fixed to the plurality of extension arms. The central pivot device may be configured and biased to pivot the plurality of extension arms from a compact configuration to an expanded configuration once the SDM is deployed from the sonoshell while airborne.

In various embodiments, the sonoshell may restrict the central pivot device from pivoting to the expanded configuration while the SDM is disposed within the sonoshell. A release mechanism may be contained within the sonoshell. The release mechanism may include a chute latch and an aerial vehicle latch for controlling a separate release of each of a parachute and the SDM from the sonoshell. Engagement of a catch included in the aerial vehicle latch with a distal portion of an extension arm may hold the SDM within the sonoshell. A pivot axis of the central pivot device may extend perpendicular to a longitudinal extent of the plurality of extension arms in both the compact configuration and the expanded configuration.

Various embodiments may include a method of deploying an SDM. The method may include deploying a parachute from a sonoshell encasing the SDM. The SDM may include a first pair of extension arms supporting a first pair of rotors and a second pair of extension arms supporting a second pair of rotors. The first pair of extension arms may be configured and biased to pivot in unison relative to the second pair of extension arms from a compact configuration to an expanded configuration. While disposed within the sonoshell, the first and second pair of extension aims may be held in the compact configuration. In addition, the method may include opening an aerial vehicle latch of a release mechanism within the sonoshell. Opening the aerial vehicle latch may allow the SDM to separate from the sonoshell with the parachute still tethered to the sonoshell. Separation from the sonoshell may release the first and second pair of extension arms to pivot into the expanded configuration.

In various embodiments, the method may include determining whether the sonoshell is at or below a predetermined altitude, wherein deploying the parachute is in response to determining the sonoshell is at or below the predetermined altitude. The first and second pair of rotors may be activated to initiate flight in response to the first and second pair of extension arms pivoting into the expanded configuration. The aerial vehicle latch may be opened to disengage a catch from a distal portion of one of the first pair of extension arms. The method may include determining whether the sonoshell is moving at or below a predetermined speed, wherein opening the aerial vehicle latch is in response to determining the sonoshell is moving at or below the predetermined speed. The method may include ejecting the sonoshell, in which the SDM is housed, from an airborne vehicle. In addition, the method may include deploying a drogue chute along with the sonoshell.

Further embodiments include a UAS having a processor configured to execute operations of the methods described above. Further embodiments include a UAS having means for performing functions of the method operations described above. Further embodiments include a non-transitory processor-readable storage medium having stored thereon processor-executable instructions configured to cause a processor to perform operations of the above-discussed method operations.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the various embodiments.

FIG. 5A is a perspective view of a UAS with a drogue chute deployed according to various embodiments.

FIG. 5B is a schematic cross-sectional elevation view of the UAS in FIG. 5A.

FIG. 6A is a perspective view of a UAS with a main parachute deployed according to various embodiments.

FIG. 6B is a schematic cross-sectional elevation view of the UAS in FIG. 6A.

DETAILED DESCRIPTION

Figure 1:
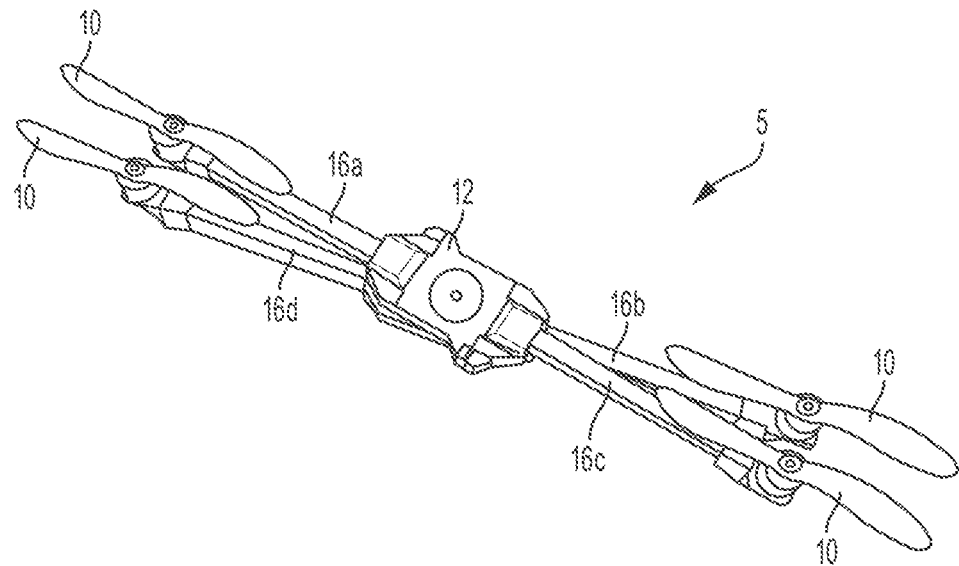
FIG. 1 is a perspective view of a sonotube deployable multicopter (SDM) of an unmanned aerial system (UAS) in a compact configuration according to various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

As used herein, the terms "unmanned aerial system" and "UAS" are used herein interchangeably to refer to a system that includes at least one of various types of remote controlled and/or autonomous aerial vehicles that may not utilize onboard, human pilots. A UAS may include one or more onboard computing devices configured to operate the UAS without remote operating instructions (i.e., autonomously), such as from a human operator or remote computing device. Alternatively, the onboard computing device(s) may be configured to operate the UAS with some remote operating instruction or updates to instructions stored in a memory of the onboard computing device(s). The UAS may include a sonoshell, one or more parachutes, and a sonotube deployable multicopter (SDM). The UAS may include additional components, such as one or more parachutes, microcontrollers, sensors, and a release mechanism for deploying one or more parachutes and/or the SDM from within the sonoshell.

As used herein, the tell is "sonotube deployable multicopter" and "SDM" are used herein interchangeably to refer to an aerial vehicle configured to be self-propelled for movement in any of a number of known ways. For example, the SDM may include a plurality of propulsion units, each including one or more propellers, ducted fans, or jets, may provide propulsion or lifting forces for the SDM and any payload or equipment carried by the SDM for travel or movement through or across a fluid surface. The SDM may include multiple direct lift motors, such as tricopters, quadcopters, and hexacopters. Such direct lift motors may be miniaturized motors and electronics to the point where the aircraft as a whole can be reduced in size while maintaining the ability to carry sensors, payload, and/or other equipment.

As used herein, the term "sonoshell" refers to any protective shell configured to hold the SDM and additional components (e.g., parachutes, a microcontrollers, sensors, microcontroller(s), and deployment elements). In various embodiments, a sonoshell containing the SDM and additional components may be jettisoned or fired from an altitude, such as from an airborne vehicle. In addition, the sonoshell may be sufficiently rugged to be deployed in hostile environments, such as from a moving aircraft at extreme altitudes. In this way, the sonoshell may be formed of carbon-fiber, plastic, metal (e.g., aluminum, stainless steel, or other suitable metal), composites, a combination thereof, or any suitable material. For example, the sonoshell may be a cylindrical shell having approximately a five inch (5") diameter and being approximately thirty six inches (36") long. Larger or smaller sonoshells may be used to accommodate larger or smaller SDMs and/or additional components. In various embodiments, the sonoshell is formed to have a cylindrical shape, similar to that of a conventional sonobouy tube or sonotube.

In accordance with various embodiments, the UAS generally and particularly the SDM may be powered by one or more types of power source, such as electrical, chemical, electro-chemical, or other power reserve, which may power the propulsion units, the onboard computing device and/or other onboard components. An example SDM is illustrated in FIGS. 1-4C, 5B, 6B, 7, 9, and 11A-11C in the form of an aerial quad-copter; however, the embodiments are not limited to quad-copters and may be implemented in multicopters having any number of rotors. While various embodiments are pertinent to any type of UAS, various embodiments are described with reference to aerial UASs for ease of reference. However, the use of aerial UASs as examples is not intended to limit the scope of the claims to autonomous aerial vehicles.

Various embodiments include an SDM that may provide a low-cost, agile flight platform that may allow precise location and/or monitoring of targets or objects of interest remotely. The SDM as part of a UAS may be dropped or ejected from an aircraft or ship, in a manner similar to a conventional sonobuoy. When initially deployed, a sonoshell houses the SDM while one or more parachutes may stabilize and slow the descent before the SDM separates from the sonoshell, which may enable a high altitude drop of the UAS. The UAS is configured to drop or eject the SDM from the sonoshell once preset conditions are achieved, such as reaching a preset altitude. In addition, the SDM is configured to automatically make an in-flight transition from a compact configuration to an expanded configuration. Once fully deployed, the ability of the SDM to hover may allow persistent video (e.g., electro-optical) or infrared feedback to a local or remote operator, who may be airborne, land-based, or sea-based. In addition, the SDM may be capable of forward flight exceeding 35 knots, for tracking a wide variety of targets of interest, including virtually all maritime targets of interest and the majority of vehicles and animals operating on unprepared surfaces. Unlike a fixed wing aircraft, the SDM may allow integration of non-streamlined and unbalanced sensors or payloads.

A UAS in accordance with various embodiments may be configured with processing components that enable the UAS, including each of the sonoshell and/or the SDM, to navigate, such as by controlling the motors to achieve directionality, and communication components that enable the UAS to receive position information and information from external systems including servers, access points, or other aerial vehicles. The position information may be associated with a current UAS position, waypoints, travel paths, avoidance paths/sites, altitudes, destination sites, locations of charging stations, relative locations of other aerial vehicles, and potential energy harvesting sites. The position information may be based on a relative position or an absolute position (i.e., geographic coordinates) obtained from a sensor (onboard or remote) or from communications with a computing device (e.g., server, global navigation satellite system (GNSS), or positioning beacon).

Figure 2:
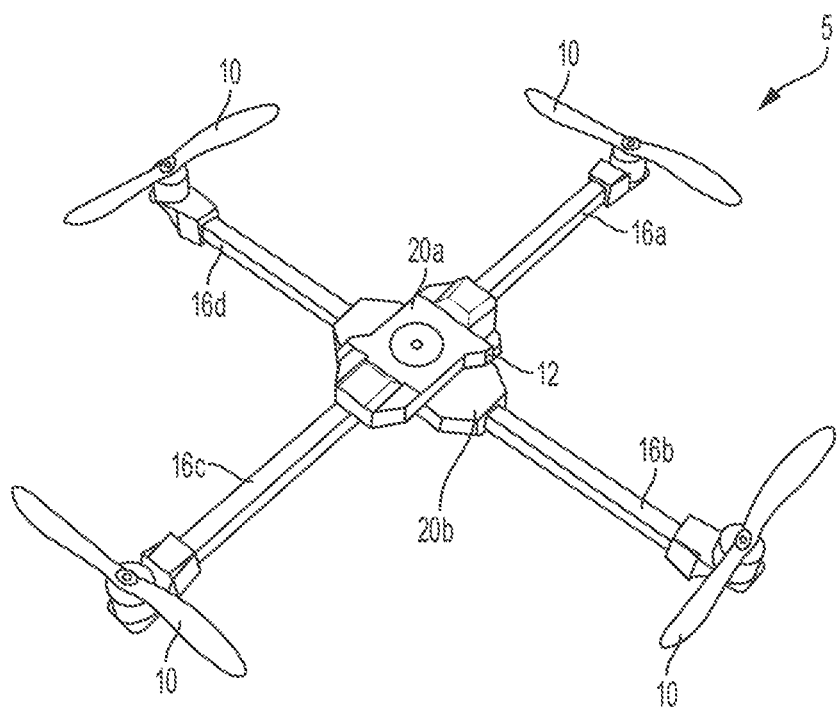
FIG. 2 is a perspective view showing the SDM of FIG. 1 in an expanded configuration according to various embodiments.

FIGS. 1 and 2 illustrate an SDM 5 of a UAS, in accordance with various embodiments. The SDM 5 may include a plurality of rotors 10 configured to generate propulsion, which include propellers each driven by a motor. The rotors 10 may each be mounted on an extension arm 16a, 16b, 16c, 16d. Each of the extension arms 16a, 16b, 16c, 16d extend from a central pivot device 12 and holds one of the rotors 10 at a distal end thereof. The central pivot device 12 may include a first (i.e., upper) arm-support structure 20a and a second (i.e., lower) arm-support structure 20b. The first arm-support structure 20a and the second arm-support structure 20b may be configured to pivot relative to one another around a vertical axis (i.e., extending into and out of the page in the orientation shown in FIGS. 1 and 2). A pivotal movement of the first arm-support structure 20a relative to the second arm-support structure 20b enables the SDM 5 to change between a compact configuration (e.g., shown in FIG. 1) and an expanded configuration (e.g., shown in FIG. 2). The central pivot device 12 may be configured to automatically pivot from the compact configuration to the expanded configuration to enable an in-flight transitions during deployment. In this way, the SDM 5 may be released in-flight in the compact configuration and automatically reconfigure itself to the expanded configuration to achieve navigation flight. The central pivot device 12 may provide the automatic pivotal movement by including a torsion spring or other stored energy device that works on the first arm-support structure 20a and the second arm-support structure 20b to bias the pivotal movement from the compact configuration toward the expanded configuration. Alternatively, the two arm-support structures 20a, 20b may be made to move from the compact configuration to the expanded configuration by a powered servo. In another embodiment, a powered servo may provide sufficient torque to maintain the expanded configuration during powered flight.

A first pair of the extension arms 16a, 16c may be fixed to the first arm-support structure 20a and a second pair of the extension arms 16b, 16d may be fixed to the second arm-support structure 20b. The first pair of extension arms 16a, 16c thus extend in opposed directions away from the first arm-support structure 20a along a first mutual longitudinal axis. Similarly, the second pair of extension aims 16b, 16d extend in opposed directions away from the second arm-support structure 20b along a second mutual longitudinal axis. The pivotal movement of the first arm-support structure 20a relative to the second arm-support structure 20b rotates the first pair of extension arms 16a, 16c in unison relative to the second pair of extension arms 16b, 16d. Thus, both of the first pair of extension arms 16a, 16c and the second pair of extension arms 16b, 16d maintain mutual longitudinal axis, respectively, during the pivotal movement.

Figure 3A:
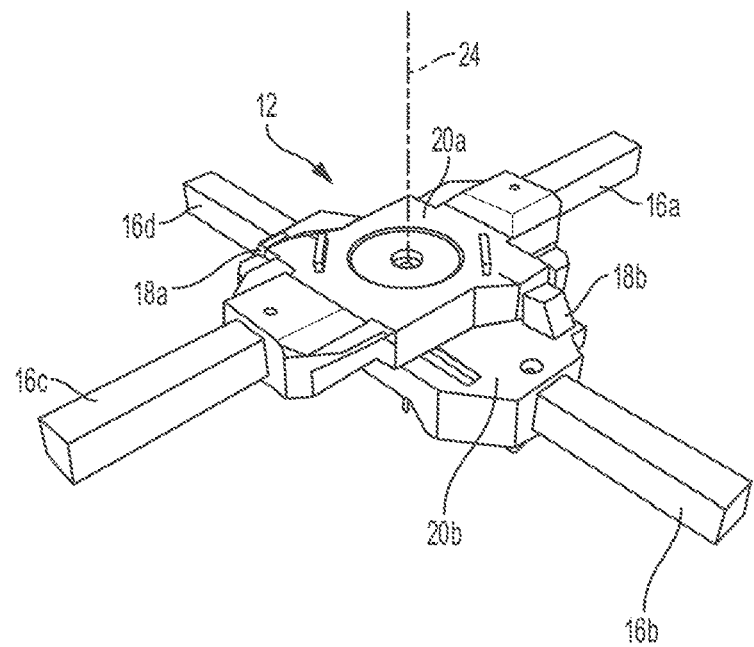
FIG. 3A is a perspective view of a central pivot device of an SDM according to various embodiments.
Figure 3B:
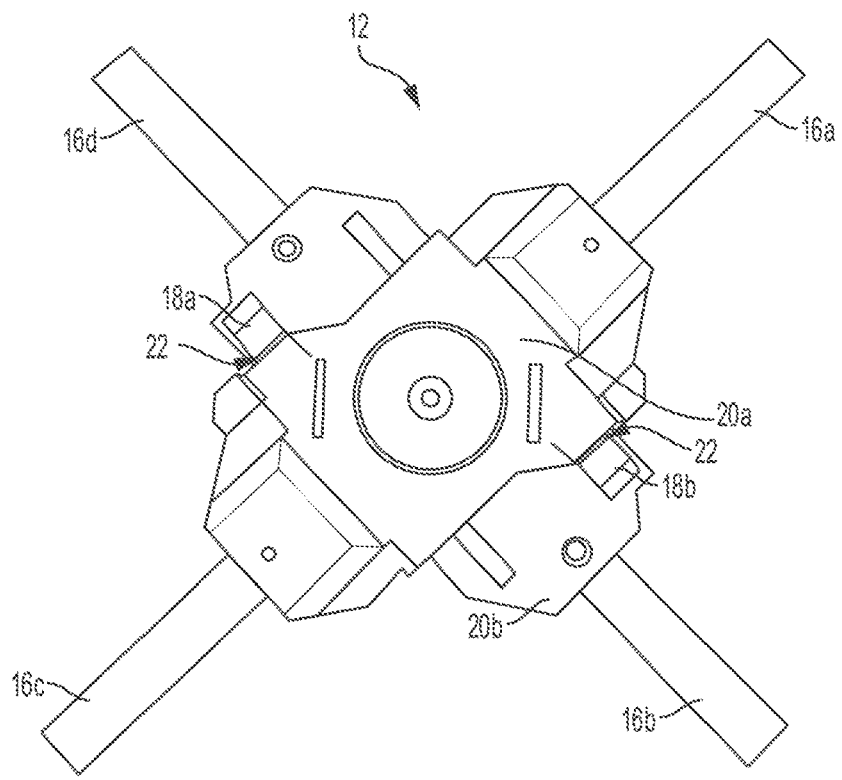
FIG. 3B is a top view of the central pivot device of FIG. 3A.

FIG. 3A illustrates a close-up perspective view of the central pivot device 12 of the SDM (e.g., 5) in the expanded configuration, in accordance with various embodiments. FIG. 3B illustrates a top view of the central pivot device 12 of FIG. 3A. When unfolding from the compact configuration (e.g., FIG. 1) to the expanded configuration (e.g., FIG. 2), the first arm-support structure 20a and the second arm-support structure 20b are configured to rotate about a central axis 24 relative to one another.

The central pivot device 12 may include mechanical stops 18a, 18b for limiting the rotation of the first arm-support structure 20a relative to the second arm-support structure 20b. For example, the mechanical stops 18a, 18b, fixed relative to the second arm-support structure 20b may limit relative rotation of the first arm-support structure 20a clockwise (in the configuration shown in FIG. 3B) beyond that shown by engaging lateral surfaces of the first arm-support structure 20a. Similarly, the mechanical stops 18a, 18b, fixed relative to the second arm-support structure 20b may limit relative rotation of the first arm-support structure 20a counter-clockwise (in the configuration shown in FIG. 3B) beyond a compact configuration (e.g., FIG. 1). The mechanical stops 18a, 18b may have other shapes, sizes, and configurations, while still serving to limit rotation. In addition, catch mechanisms 22 (e.g., one or more sections of Velcro®) may be aligned with a matching element on the mechanical stops 18a, 18b to provide additional resistance, preventing the two arm-support structures 20a, 20b from rotating back to the compact configuration or at least hold the central pivot device 12 in the expanded configuration. Various embodiments may include recessed latches that pop up to prevent the central pivot device 12 from rotating out of the expanded configuration. The recessed latches may be held flush with an upper surface of the second arm-support structure 20b, through engagement with a lower surface of the first arm-support structure 20a, while the SDM is in the compact configuration. When the SDM is reconfigured to the expanded configuration, such as after exiting the sonoshell, the recessed latches may be biased by a spring or storage energy device to pop up and thus prevent the central pivot device 12 from pivoting out of the expanded configuration toward the compact configuration.

Figure 4A:
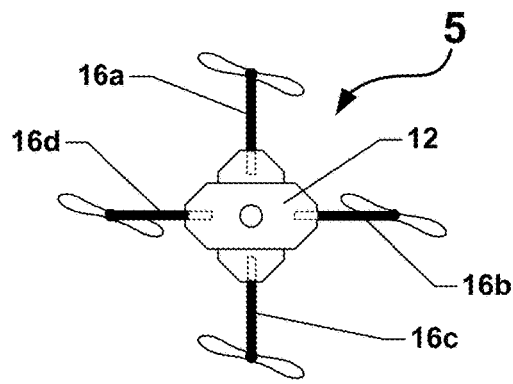
FIG. 4A is a top schematic view of an SDM according to various embodiments.

FIG. 4A illustrates a top schematic view of the SDM 5 of FIGS. 1-3B. In particular, FIG. 4A illustrates that each of the extension arms 16a, 16b, 16c, 16d is a separate element fixed to the central pivot device 12.

Figure 4B:
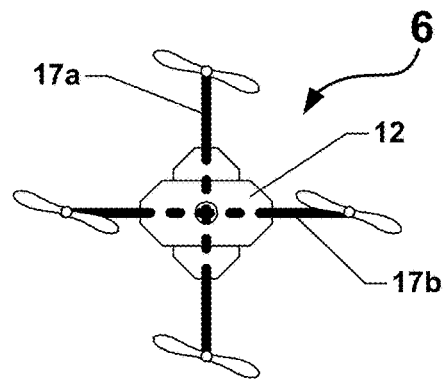
FIG. 4B is a top schematic view of another SDM according to various embodiments.

FIG. 4B illustrates a top schematic view of an embodiment SDM 6 with only two extension anus 17a, 17b, each configured to extend from opposite sides of the central pivot device 12. The two extension arms 17a, 17b are each formed as a continuous structure extending through the central pivot device 12. Such longer continuous extension arms may be more durable.

Figure 4C:
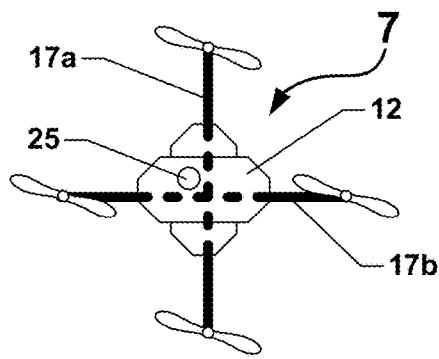
FIG. 4C is a top schematic view of another SDM according to various embodiments.

FIG. 4C illustrates a top schematic view of another embodiment SDM 7 similar to the SDM 6 in FIG. 4B. In contrast to SDM 6, the SDM 7 includes an offset pivotal axis 25. Such an offset pivotal axis 25 may provide more space for the pivotal axis hardware, as well as the biasing element (e.g., torsion spring) encouraging the SDM 7 to pivot toward the expanded configuration.

As part of a UAS, the SDM (e.g., 5, 6, 7) described above with regard to FIGS. 1-4C is configured to be folded into the compact configuration (e.g., FIG. 1) and inserted into a sonoshell for deployment from an airborne vehicle. In various embodiments, the walls of the sonoshell 26 hold the SDM 5 in the compact configuration. Optionally, prior to insertion in the sonoshell 26, the SDM 5 may be folded into the compact configuration and held that way by way of a catch, such as magnets or fasteners (e.g., Velcro®) engaging the mechanical stops 18a, 18b. In this way, the SDM 5 may hold the compact configuration to facilitate insertion into the sonoshell 26. The catch would need to be overcome or deactivated in order to reconfigure the SDM 5 to the expanded configuration once deployed from the sonoshell 26.

FIG. 5A illustrates a perspective view of a UAS 50 in a rapid descent configuration with a drogue chute 28 deployed, in accordance with various embodiments. FIG. 5B illustrates a schematic cross-sectional elevation view of the UAS 50 in FIG. 5A. The UAS 50 includes a sonoshell 26 configured to be deployed from an airborne vehicle. The drogue chute 28 may be configured to slow-down and stabilize descent of the UAS 50. The sonoshell 26 includes a hollow inner chamber 43 configured to hold the SDM 5 therein, in the compact configuration (e.g., FIG. 1). In addition, the sonoshell 26 may hold a main parachute 34 configured to further slow-down the UAS 50 prior to the release of the SDM 5. The main parachute 34 may be packed in an upper portion of the sonoshell 26.

The drogue chute 28 may be a parachute, funnel-shaped object, streamers, or the like. The drogue chute 28 need not be stored inside the sonoshell 26. Like a conventional sonobouy deployment, the drogue chute 28 may be deployed following the deployment of the sonoshell 26. Alternatively, an uppermost inside portion of the sonoshell 26 may be used to store the drogue chute 28 before deployment. Once the UAS 50 is deployed from an airborne vehicle or other deployment device, the drogue chute 28 may be configured to immediately deploy from or with the sonoshell 26.

The sonoshell 26 may include a release mechanism 60 configured to hold and selectively deploy elements of the UAS 50. For example, the release mechanism 60 may hold and selectively release the main parachute 34 and the SDM 5, separately. A microcontroller (e.g., an Arduino®), in the release mechanism 60 or elsewhere in the sonoshell 26, may use sensors or instruments to measure a first preset descent characteristic (e.g., a first altitude, velocity, time, or a combination thereof) for releasing the main parachute 34 and a second preset descent characteristic (e.g., a second altitude, velocity, time, or a combination thereof) for releasing the SDM 5. The drogue chute 28 may assist with deployment of the main parachute 34. As air fills the drogue chute 28 (i.e., during initial descent), drogue chute tethers 35 attached to the main parachute 34 may pull on the main parachute 34. The configuration and length of the drogue chute tethers 35 may be changed to suit design parameters and/or to provide certain descent characteristics. The release mechanism 60 may hold or block the drogue chute tethers 35 from pulling the main parachute 34 out of the sonoshell until the microcontroller determines the first altitude, time, or velocity is reached.

FIG. 6A illustrates a perspective view of the UAS 50 in a slow descent configuration with the main parachute 34 deployed, in accordance with various embodiments. Although the UAS 50 is illustrated in a horizontal configuration, during deployment the UAS 50 may drop in a vertical or near vertical configuration. FIG. 6B illustrates a schematic cross-sectional elevation view of the UAS 50 from FIG. 6A in a vertical configuration. The main parachute 34 may deploy after being released by the release mechanism. The main parachute 34 may include one or more fabric canopies tethered to the sonoshell 26 directly or via the release mechanism 60. The main parachute 34 may be almost any size or shape sufficient to retard the fall of the UAS 50 and small enough to be packed into the upper portion of the sonoshell 26. The drogue chute 28 may remain attached to the main parachute 34, trailing above, during the descent.

The release mechanism 60 may hold or block the SDM 5 from dropping out of the sonoshell 26 until the microcontroller determines the second altitude, time, velocity, or other parameter is reached. Once released, the weight of the SDM 5 may allow the SDM 5 to drop out of and separate from the sonoshell 26. Alternatively, a biasing mechanism (e.g., a spring) may push the SDM 5 out of the sonoshell 26.

Figure 7:
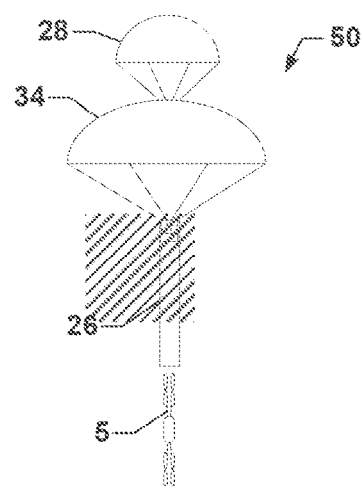
FIG. 7 is a schematic cross-sectional elevation view of a UAS with the SDM separated according to various embodiments.

FIG. 7 illustrates a schematic cross-sectional elevation view of the UAS 50 in an SDM released configuration with the SDM 5 separated from the sonoshell 26, in accordance with various embodiments. Although the SDM 5 is illustrated in the compact configuration, once the SDM 5 separates from the sonoshell 26, the central pivot device (e.g., 12 in FIGS. 1 and 2) may automatically unfold the SDM 5 into the expanded configuration. The automatic unfolding enables an in-flight transition from the compact configuration to the expanded configuration.

Figure 8A:
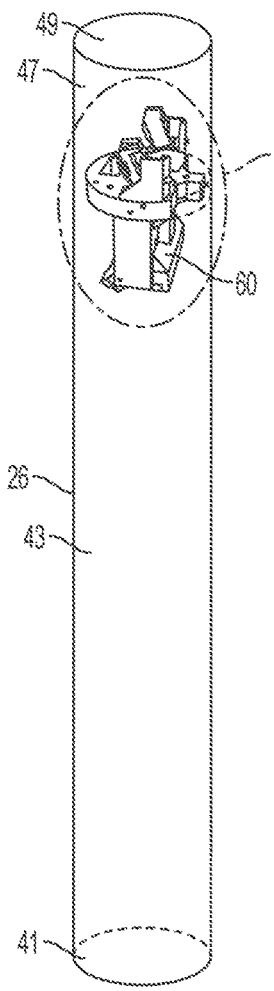
FIG. 8A illustrates a perspective view of a sonoshell with a release mechanism according to various embodiments.

FIG. 8A illustrates a perspective view of the sonoshell 26 with the release mechanism 60, in accordance with various embodiments. The sonoshell 26 is illustrated as being transparent in order to reveal the release mechanism 60 therein. Other elements of the UAS (e.g., the SDM 5, the drogue chute 28, the main parachute 34) are removed for illustrative purposes in order to show the release mechanism 60 and other aspects of the sonoshell 26.

In various embodiments, the sonoshell 26 has a cylindrical shape for deployment from a sonobouy tube (i.e., sonotube). Alternatively, the sonoshell 26 may be almost any shaped container, which may be suited for being dropped out of an airborne vehicle. The sonoshell 26 may include gaps or apertures in the vertically extending casing. Gaps or apertures in the side walls of the sonoshell may reduce the weight of the sonoshell 26, provide access to components therein, control pressure differential or air flow between an outside and an inside of the sonoshell 26. For example, a wire may temporarily extend through an aperture in the sonoshell 26 for recharging a power supply or programming a microcontroller of the UAS. Similarly, an aperture may be used to add, remove, and/or replace components of the UAS (e.g., a microcontroller memory card). A lower portion of the sonoshell 26 may include the hollow inner chamber 43, which is configured to receive the SDM in a compact configuration. The SDM may be loaded into and deployed from the hollow inner chamber 43 through a lower opening 41. An upper portion of the sonoshell 26 may also include an upper chamber 47, which is configured to receive at least the main parachute and optionally the drogue chute as well. The main parachute and optionally the drogue chute may be loaded into and deployed from the upper chamber 47 through an upper opening 49. The release mechanism 60 may be firmly fixed to the casing forming the sonoshell 26, disposed between the upper chamber 47 and the hollow inner chamber 43. In various embodiments, the release mechanism 60 may separate the upper chamber 47 from the hollow inner chamber 43.

Figure 8B:
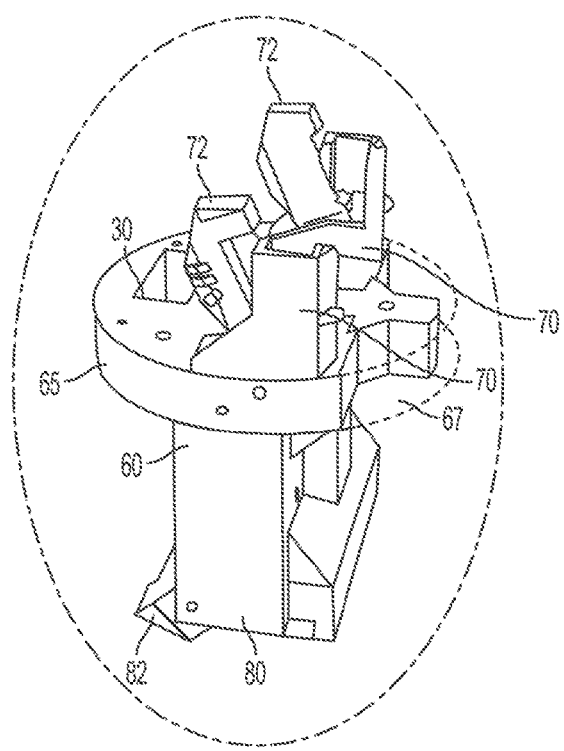
FIG. 8B is a relief view of the release mechanism in FIG. 8A.

FIG. 8B is a relief view of the release mechanism 60 from FIG. 8A. In various embodiments, a central portion 65 of the release mechanism 60 may conform at least in part to a shape of an inside contour of the sonoshell. The central portion 65 may serve to separate the main parachute above from the SDM below. In addition, the central portion 65 may support a microcontroller 30, which may be used to control the UAS and particularly the release mechanism 60. The central portion 65 may include one or more gaps 67 (i.e., apertures) to accommodate longer rotor blade extending from below the central portion 65 toward the top of the sonoshell. Alternatively, the central portion 65 may shaped differently and/or include additional gaps or apertures (i.e., less material) for reducing weight or fewer gaps or apertures (i.e., more material) for increasing strength and durability. Gaps or apertures in the central portion 65 may also be used to promote air movement and/or control air pressure inside the sonoshell 26. For example, providing more gaps may maintain a more constant air pressure above and below (i.e., across) the release mechanism 60, while providing less or smaller gaps in the central portion 65 may promote a pressure differential.

An upper portion of the release mechanism 60 may include a chute latch 70 for selectively holding and releasing the main parachute. In various embodiments, the chute latch 70 may include two pivotal upper aims 72 configured to hold and selectively release the tethers from the drogue chute, which once released will pull the main parachute out of the upper chamber of the sonoshell.

A lower portion of the release mechanism 60 may include an SDM latch 80 for selectively holding and releasing the SDM. In various embodiments, the SDM latch 80 may include a pivotal lower bracket 82 configured to hold and selectively release part of the structure of the SDM, which once released will allow the SDM to drop out of the hollow inner chamber of the sonoshell.

Figure 9:
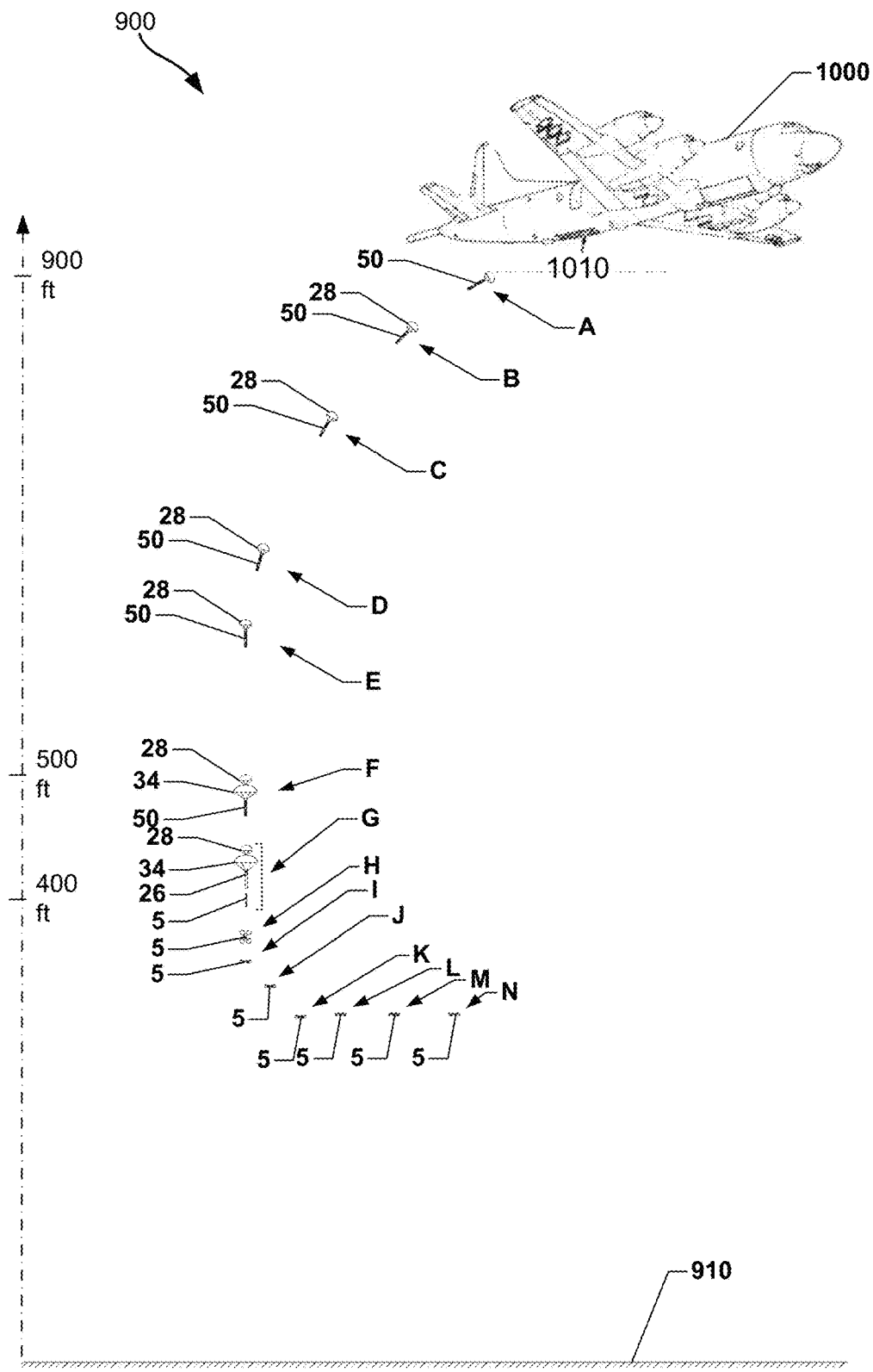
FIG. 9 is an overview of various phases during deployment of a UAS according to various embodiments.

FIG. 9 illustrates an overview of various phases (i.e., A-N) during a deployment 900 of the UAS 50 from an airborne vehicle 1000, in accordance with various embodiments. The airborne vehicle 1000 may include a launch mechanism 1010, such as a tubular shoot for deploying sonotubes or similar cylindrical canisters. Although the airborne vehicle 1000 is illustrated as an airborne vehicle (e.g., a p-3C US Navy patrol aircraft), the UAS may be deployed from virtually any airborne vehicle, including elevated structures such as towers, building, natural formations, or combinations thereof Once the UAS 50 is dropped and/or ejected from the airborne vehicle 1000, the UAS 50 may achieve the rapid descent configuration, described above with regard to FIGS. 5A and 5B. In FIG. 9, phases A through E include the rapid descent configuration (i.e., the rapid descent phases) in which the drogue chute 28 is deployed and the UAS 50 quickly drops from the ejection altitude (e.g., 900 ft.). Although the drogue chute 28 may slow the descent of the UAS 50 somewhat, it may more noticeably stabilize and help properly orient the UAS 50 in a vertical configuration during the initial descent. The change in orientation from an almost horizontal orientation at phase A to a vertical orientation at phase E illustrates the stabilization provided by the drogue chute 28.

During the rapid descent phases A-E, the microcontroller (e.g., 30) may determine whether the UAS 50 has reached a first preset descent characteristic. The first preset descent characteristic may be used to deploy the main parachute when certain conditions are achieved. For example, using an altimeter included in the UAS 50 and 500 feet as the first preset descent characteristic, the altimeter may indicate to the microcontroller when the UAS 50 has descended to an altitude of 500 ft. Once the microcontroller detects the UAS 50 has descended to 500 feet, the microcontroller may deploy the main parachute. Alternatively, the first preset descent characteristic may use a different altitude, a first preset velocity, a first preset time (i.e., duration of descent), or a combination thereof. Alternatively, the UAS 50 may not use a main parachute (e.g., 34) and thus need not make determinations regarding the first preset descent characteristic.

Once the main parachute 34 is deployed, the UAS 50 may achieve the slow descent configuration, described above with regard to FIGS. 6A and 6B. In FIG. 9, phase F includes the slow descent configuration (i.e., the slow descent phase) in which the main parachute 34 is deployed and the UAS 50 more slowly continues to descend. During the slow descent phase F, the microcontroller (e.g., 30) may determine whether the UAS 50 has reached a second preset descent characteristic. Additionally, if the main parachute fails to deploy (e.g., malfunction) or in an alternative embodiment in which no main parachute is used, the microcontroller may still determine whether the UAS 50 has reached the second preset descent characteristic even though the UAS is still in the rapid descent configuration. The second preset descent characteristic may be used to deploy the SDM from the sonoshell when certain conditions are achieved. For example, using the altimeter and 400 feet as the second preset descent characteristic, the altimeter may indicate to the microcontroller when the UAS 50 has descended to an altitude of 400 ft. Once the microcontroller detects the UAS 50 has descended to 400 feet, the microcontroller may release the SDM 5. Alternatively, the second preset descent characteristic may use a different altitude, a second preset velocity, a second preset time (i.e., further duration of descent), or a combination thereof. Thus, the determination regarding the second preset descent characteristic may not be dependent on the determination regarding the first preset descent characteristic.

Once the SDM 5 is released from the sonoshell 26, the UAS 50 may achieve the separation configuration, described above with regard to FIG. 7. In FIG. 9, phase G includes the separation configuration in which, at least for a brief moment, the SDM 5 is released and is starting or in the process of reconfiguring from the compact (i.e., folded) configuration to the expanded (i.e., unfolded) configuration.

Once the SDM 5 is in the expanded configuration, as described above with regard to FIG. 2, a microcontroller onboard the SDM may power on the rotors (e.g., 10) and use an autopilot to level a flight of the SDM 5. In FIG. 9, phase H includes an expanded configuration in which, at least for a brief moment, the SDM 5 has not yet achieved level flight. In FIG. 9, phases I through N illustrate the SDM 5 having achieved level flight and executing a pre-set flight plan, remotely controlled navigational flight, and/or other SDM flight operations. During phases H through N, the sonoshell 26, main parachute 34, and drogue chute 28 may continue a slow descent to the ground 910.

Figure 10A:
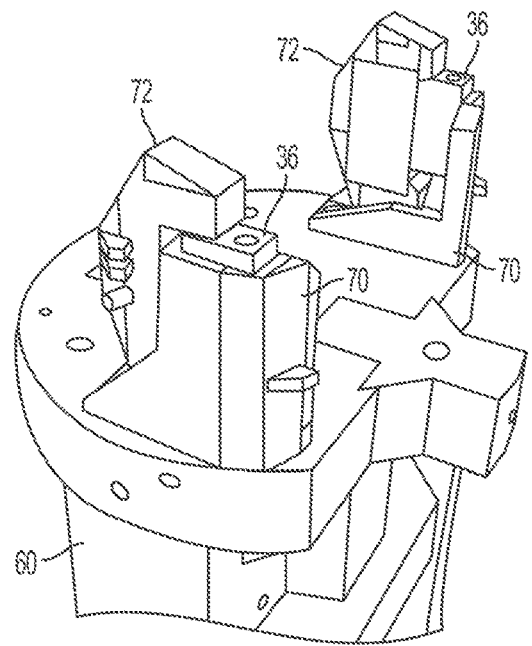
FIG. 10A is a perspective view of a chute latch, from a release mechanism, in a closed configuration according to various embodiments.

FIG. 10A is a close-up perspective view of the chute latch 70, from the release mechanism 60, in a closed configuration in accordance with various embodiments. In the closed configuration, the chute latch 70 is configured to restrain the drogue chute tether blocks 36. The drogue chute tether blocks 36 may be attached to the drogue chute tethers (e.g., 35), such as at an upper surface of the drogue chute tether blocks 36. In addition, the drogue chute tether blocks 36 may be attached to the main parachute (e.g., 34), such as at a lower surface of the drogue chute tether blocks 36, either directly or through additional tethers (not illustrated).

Figure 10B:
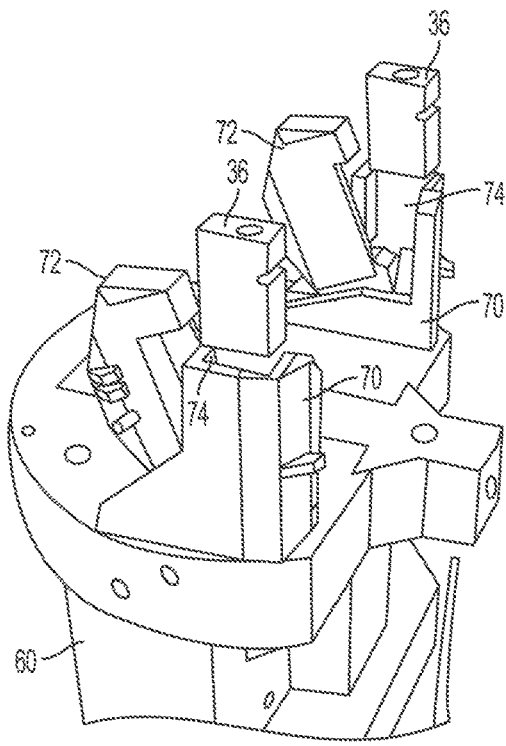
FIG. 10B is a perspective view of the chute latch in FIG. 10A in an open configuration.

FIG. 10B is a close-up perspective view of the chute latch 70 in an open configuration in accordance with various embodiments. The microcontroller, controlling the release mechanism 60, may change the chute latch 70 from the closed configuration to the open configuration. In the open configuration, the chute latch 70 may release the drogue chute tether blocks 36 (shown in FIG. 10B separated and hovering over the chute latch 70). As the drogue chute (e.g., 28) trails behind the sonoshell (e.g., 26) during the rapid descent of the UAS (e.g., 50), the drogue chute tethers pull on the drogue chute tether blocks 36. Thus, with the drogue chute tether blocks 36 released, the drogue chute will pull the drogue chute tether blocks 36 from holding slots 74 in the chute latch 70, which in-turn may pull the main parachute out of the upper chamber (e.g., 47) of the sonoshell (e.g., 26).

In various embodiments, the chute latch 70 includes a mirrored pair of latches. However, it should be understood that a single latch or more that two latches may be used. In operation, the microcontroller controlling the release mechanism 60 may open the chute latch 70 by activating a servo to pivot the two pivotal upper arms 72 away from the drogue chute tether blocks 36. Alternatively, the two pivotal upper arms 72 may be biased with a spring to pivot to the open configuration, such that the microcontroller opens a locking mechanism holding the two pivotal upper arms 72 from pivoting in order to allow the two pivotal upper arms 72 to pivot.

Figure 11C:
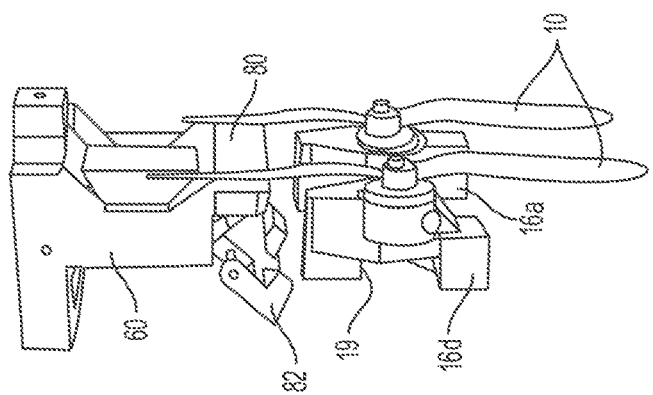
FIG. 11C is a perspective view of the SDM latch in FIGS. 11A and 11B in an open configuration, with the SDM separating from a sonoshell according to various embodiments.
Figure 11B:
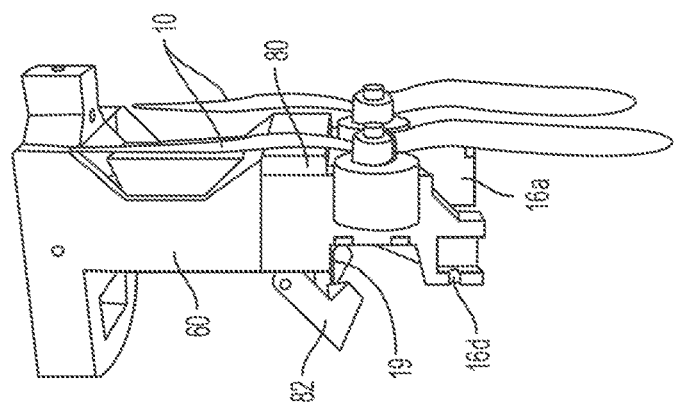
FIG. 11B is a perspective view of the SDM latch in FIG. 11A in an open configuration according to various embodiments.
Figure 11A:
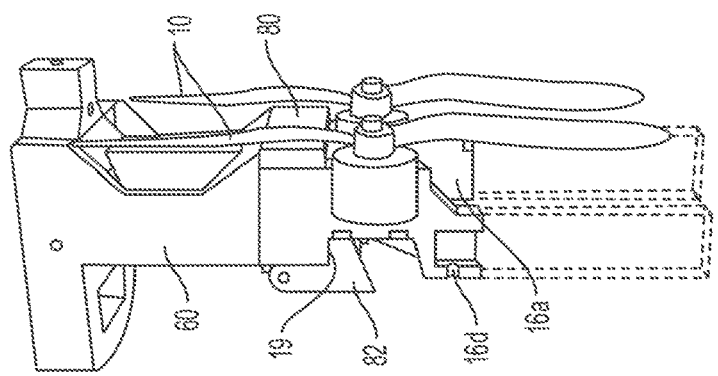
FIG. 11A is a perspective view of an SDM latch, from a release mechanism, in a closed configuration according to various embodiments.

FIG. 11A is a close-up perspective view of the SDM latch 80 in a closed configuration, holding a distal end of two extension arms 16a, 16d, in accordance with various embodiments. In the closed configuration, the SDM latch 80 is configured to restrain the SDM (e.g., 5). In FIG. 11A the distal tips of the two extension arms 16a, 16d are illustrated as solid-filled elements, while the more proximal extents of the two extension arms 16a, 16d are illustrated with phantom lines. A distal end of each the two extension arms 16a, 16d may include latch receiving surfaces 19 that may be engaged and held by the pivotal lower bracket 82.

FIG. 11B is a close-up perspective view of the SDM latch 80 from FIG. 11A, but shown in an open configuration (i.e., commanded to release) in accordance with various embodiments. The microcontroller, controlling the release mechanism 60, may change the SDM latch 80 from the closed configuration to the open configuration. To do so, the microcontroller may pivot the pivotal lower bracket 82 away from the latch receiving surfaces 19. In the open configuration, the SDM latch 80 may release the latch receiving surfaces 19 and thus release the SDM, allowing the SDM to fall out of or be ejected from the sonoshell (e.g., 26).

FIG. 11C is a close-up perspective view of the SDM latch 80 in the open configuration from FIG. 11B, but shown with the SDM (e.g., 5) separating downward from the SDM latch 80, in accordance with various embodiments. Once the SDM latch 80 is opened (i.e., moved to the open configuration), the SDM will slide down and out of the sonoshell and expand from the compact configuration.

Figure 12:
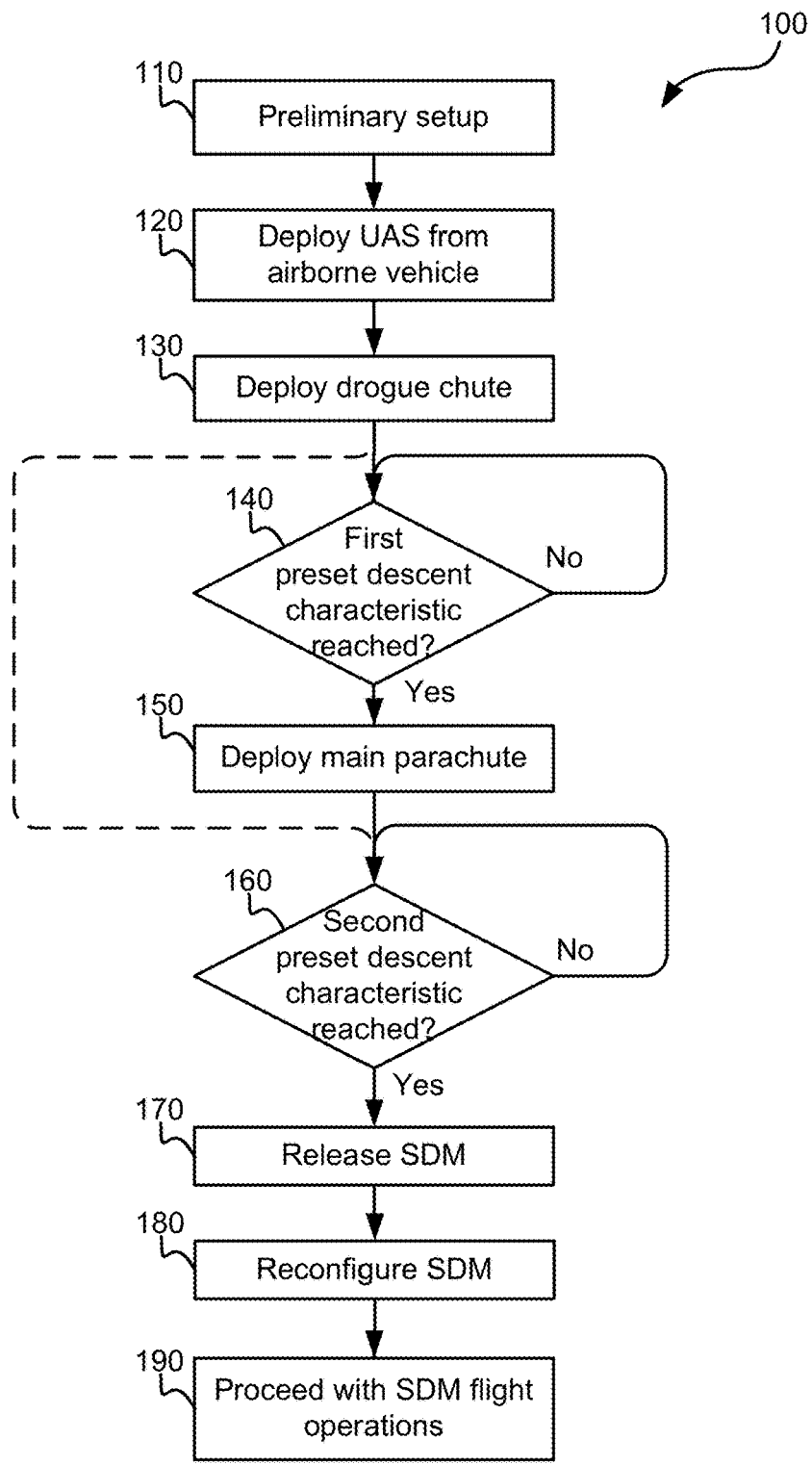
FIG. 12 is a process flow diagram of a method of deploying a UAS according to various embodiments.

FIG. 12 illustrates a process flow 100 of deploying a UAS, in accordance with various embodiments. In block 110, the UAS may be preliminarily setup by loaded in the sonoshell (e.g., 26) along with the SDM (e.g., 5, 6, 6) and sonoshell deployable multicopter (SDM) main parachute (e.g., 34). Optionally, the drogue chute (e.g., 28) may also be loaded into the sonoshell. The UAS may be set/programmed for deployment at a preset altitude. Setting/programming the UAS may be accomplished prior to deployment (e.g., by aircrew) or well before then by appropriate personnel. In addition, duty functions and waypoint flight plan(s) (e.g., a box search or ladder search protocol) for the UAS or particularly the SDM may be entered.

In block 120, the UAS may be deployed (i.e., ejected or dropped), such as from an airborne vehicle. In this way, the UAS packed inside and protected by the sonoshell will descend from a release altitude.

In block 130, following the deployment of the entire UAS, a drogue chute (e.g., 28) may be deployed from the UAS. The deployment of the drogue chute may be immediate or in accordance with a predetermined delay following the deployment of the UAS from the aircraft. The drogue chute allows rapid descent to the desired altitude while maintaining the UAS in a stable, vertical orientation.

In determination block 140, a microcontroller (e.g., 30) may determine whether the UAS has reached a first preset descent characteristic, such as altitude, velocity, time, another parameter, or a combination thereof. For example, using a preset altitude as the first preset descent characteristic, the preset altitude may be detected by one or more sensors (including a barometric and temperature sensor on a sensor module) connected to a microcontroller inside of the sonoshell 26. In response to the first preset descent characteristic not being reached (i.e., determination block 140="No"), the microcontroller may continue monitoring the first preset descent characteristic until the first preset descent characteristic is reached. In response to the first preset descent characteristic being reached (i.e., determination block 140="Yes"), the microcontroller may deploy the main parachute in block 150. In the event the drogue chute disconnects, fails to deploy, or otherwise does not operate properly, the microcontroller may still determine whether the UAS has reached a first preset descent characteristic. Alternatively, a main parachute need not be used and the process may proceed to determination block 160 following the deployment of the drogue chute in block 130 or even if the drogue chute does not operate properly.

In block 150, the main parachute may be released via a servo, also connected to the microcontroller. The same servo may also be used to assist in deploying the drogue chute (e.g., 28).

In determination block 160, a microcontroller (e.g., 30) may determine whether a second preset descent characteristic is reached. For example, using a preset velocity as the second preset descent characteristic, the preset velocity may reflect that the UAS has sufficiently decelerated. Additionally or alternatively, the second preset descent characteristic may include a second (lower) preset altitude. The second preset altitude may be detected by one or more sensors connected to the microcontroller. In response to the UAS not reaching the second preset descent characteristic (i.e., determination block 160="No"), the microcontroller may continue monitoring the second preset descent characteristic until the second preset descent characteristic is reached. In response to the second preset descent characteristic being reached (i.e., determination block 160="Yes"), the microcontroller may release the SDM in block 170.

In block 170, with the UAS having sufficiently decelerated and reached the preset deployment altitude, which may be sensed by the microcontroller via accelerometers on a sensor module, the SDM may be released from the other UAS components including the sonoshell. The SDM may be released by a servo which in one embodiment retracts retaining hooks or pins from the SDM motor mounts. Alternatively, in another embodiment a spring may be releasing to forcibly eject the SDM from the deployment sonoshell.

In block 180, once the SDM is clearly separated from the sonoshell the SDM may be reconfigured from the compact (i.e., folded) configuration to the expanded (i.e., unfolded) configuration.

In block 190, once the SDM is in the extended configuration, the microcontroller may power on the rotors and proceed with SDM flight operations. For example, the microcontroller may execute autopilot operations that may level the SDM. With the SDM leveled, the pre-set flight plan may be executed or remote operator(s) will command the SDM via a wireless control system through a miniaturized 3-axis autopilot mounted on the SDM. The autopilot operations may translate global navigation satellite system (GNSS) waypoints and/or user commands into inputs to drive the individual motors to achieve the commanded response.

The SDM may then employ a potentially wide variety of sensors as programmed or manually directed by an operator, and can be commanded to self-destruct or crash depending on payload sensitivity. If the battery depletes to a predetermined value, the self-destruct or crash sequence may be automatically be initiated. The SDM and/or one or more parts of the UAS may be designed for a one-time use or single-use (disposable), but may be re-used if operated in a remote package delivery alternate embodiment.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the spirit or scope of the claims. Thus, the present disclosure is not intended to be limited to the embodiments shown herein but is to be accorded the widest scope consistent with the following claims and the principles and novel features disclosed herein.

What is claimed is:

1. A sonoshell deployable multicopter (SDM), comprising:
   a plurality of rotors configured to generate propulsion for the SDM,
   a plurality of extension arms, wherein each extension arm supports at least one of the plurality of rotors; and
   a central pivot device supporting the plurality of extension arms radially extending from the central pivot device, wherein pivotal movement of a first arm-support structure of the central pivot device relative to a second arm-support structure of the central pivot device rotates a first pair of the plurality of extension arms in unison relative to a second pair of the plurality of extension arms, wherein the pivotal movement is biased to rotate the plurality of extension arms from a compact configuration to an expanded configuration while the SDM is airborne,
   wherein the SDM is configured to be deployable from a sonoshell, and
   wherein each pair of arms in the first pair and second pair of the plurality of extension arms is axially aligned with one another in the compact configuration.

2. The SDM of claim 1, wherein the first pair of the plurality of extension arms are fixed to the first arm-support structure and the second pair of the plurality of extension arms are fixed to the second arm-support structure.

3. The SDM of claim 1, wherein each of a first extension arm and a second extension arm of the plurality of extension arms extends in opposed directions from the central pivot device, wherein the first extension arm and the second extension arm extend along a mutual longitudinal axis in both the compact configuration and the expanded configuration.

4. The SDM of claim 3, wherein the first extension arm and the second extension arm are formed together as a continuous structure extending through the central pivot device.

5. The SDM of claim 1, wherein the first pair of the plurality of extension arms extend in opposed directions away from the first arm-support structure along a first mutual longitudinal axis and the second pair of the plurality of extension arms extend in opposed directions away from the second arm-support structure along a second mutual longitudinal axis.

6. An unmanned aerial system (UAS), comprising:
   a sonoshell configured to be deployed from an airborne vehicle, wherein the sonoshell is configured with a hollow inner chamber for holding therein a sonoshell deployable multicopter (SDM) in a compact configuration, wherein the SDM is biased to expand from the compact configuration to an expanded configuration once released from the sonoshell while airborne, wherein the sonoshell includes a release mechanism contained therein, wherein the release mechanism includes a chute latch and an SDM latch for controlling a release separately of each of a parachute and the SDM from the sonoshell.

7. The UAS of claim 6, wherein the sonoshell restricts the SDM from pivoting to the expanded configuration while the SDM is disposed within the sonoshell.

8. The UAS of claim 6, wherein the UAS comprises:
   the SDM comprising:
     a plurality of rotors configured to generate propulsion for the SDM,
     a plurality of extension arms, wherein each extension arm supports at least one of the plurality of rotors; and
     a central pivot device supporting the plurality of extension arms radially extending from the central pivot device, wherein a first arm-support structure of the central pivot device is biased to pivot relative to a second arm-support structure of the central pivot device, wherein pivotal movement of the first and second arm-support structures rotates a first pair of the plurality of extension arms in unison relative to a second pair of the plurality of extension arms from the compact configuration to the expanded configuration while the SDM is airborne.

9. The UAS of claim 6, further comprising:
   a drogue chute configured to stabilize the sonoshell once deployed from the airborne vehicle; and
   the parachute configured to deploy from the sonoshell after a rapid fall period following the sonoshell being deployed from the airborne vehicle.

10. An unmanned aerial system (UAS), comprising:
a sonoshell configured to be deployed from an airborne vehicle; and
a sonoshell deployable multicopter (SDM) configured to be held within and deployed from the sonoshell, the SDM including a plurality of rotors to generate propulsion for the SDM, a plurality of extension arms supporting the plurality of rotors, and a central pivot device fixed to the plurality of extension arms, wherein the central pivot device is configured and biased to pivot the plurality of extension arms from a compact configuration to an expanded configuration once the SDM is deployed from the sonoshell while airborne,
wherein each pair of arms in a first pair and a second pair, respectively, of the plurality of extension arms is axially aligned with one another in the compact configuration.

11. The UAS of claim 10, wherein the sonoshell restricts the central pivot device from pivoting to the expanded configuration while the SDM is disposed within the sonoshell.

12. The UAS of claim 10, further comprising:
a release mechanism contained within the sonoshell, wherein the release mechanism includes a chute latch and an aerial vehicle latch for controlling a separate release of each of a parachute and the SDM from the sonoshell.

13. The UAS of claim 12, wherein engagement of a catch included in the aerial vehicle latch with a distal portion of an extension arm holds the SDM within the sonoshell.

14. The UAS of claim 12, wherein a pivot axis of the central pivot device extends perpendicular to a longitudinal extent of the plurality of extension arms in both the compact configuration and the expanded configuration.

15. A method of deploying a sonotube deployable multicopter (SDM), comprising:
deploying a parachute from a sonoshell encasing the SDM, wherein the SDM includes a first pair of extension arms supporting a first pair of rotors and a second pair of extension arms supporting a second pair of rotors, wherein the first pair of extension arms are configured and biased to pivot in unison relative to the second pair of extension arms from a compact configuration to an expanded configuration, wherein while disposed within the sonoshell the first and second pair of extension arms are held in the compact configuration; and
opening an aerial vehicle latch of a release mechanism within the sonoshell, wherein opening the aerial vehicle latch allows the SDM to separate from the sonoshell with the parachute still tethered to the sonoshell, wherein separation from the sonoshell releases the first and second pair of extension arms to pivot into the expanded configuration.

16. The method of claim 15, further comprising:
determining whether the sonoshell is at or below a predetermined altitude, wherein deploying the parachute is in response to determining the sonoshell is at or below the predetermined altitude.

17. The method of claim 15, further comprising:
activating the first and second pair of rotors to initiate flight in response to the first and second pair of extension arms pivoting into the expanded configuration.

18. The method of claim 15, wherein opening the aerial vehicle latch disengages a catch from a distal portion of one of the first pair of extension arms.

19. The method of claim 15, further comprising:
determining whether the sonoshell is moving at or below a predetermined speed, wherein opening the aerial vehicle latch is in response to determining the sonoshell is moving at or below the predetermined speed.

20. The method of claim 15, further comprising:
ejecting the sonoshell in which the SDM is housed from an airborne vehicle; and
deploying a drogue chute along with the sonoshell.

* * * * *